Dec. 31, 1963 R. D. FISHER ETAL 3,116,159
PROCESS OF FABRICATING MAGNETIC DATA STORAGE DEVICES
Filed May 19, 1960
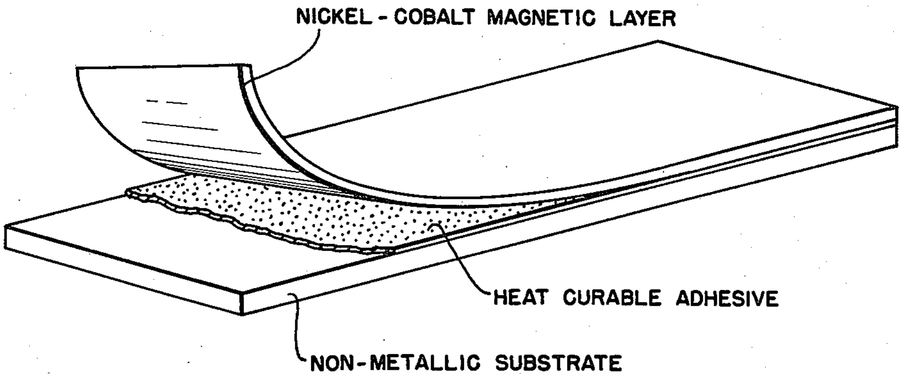
INVENTORS
ROBERT D. FISHER
ROBERT P. WILLIAMS &
FRANK J. HARSACKY
BY
HIS ATTORNEYS United States Patent Office 3,116,159
Patented Dec. 31, 1963

3,116,159

PROCESS OF FABRICATING MAGNETIC DATA STORAGE DEVICES

Robert D. Fisher, Robert P. Williams, and Frank J. Harsacky, Dayton, Ohio, assignors to The National Cash Register Company, Dayton, Ohio, a corporation of Maryland Filed May 19, 1960, Ser. No. 30,072
7 Claims. (Cl. 117—71)

The present invention relates generally to the process of fabricating magnetic data storage devices, and more specifically relates to a new and improved process for fabricating high density magnetic data storage devices which are readily adaptable for use in present day electronic computers and data processors.

It is a general object of the present invention to devise a new and improved process whereby high density magnetic data storage devices are fabricated in a simple and economical manner and which possess greatly improved magnetic and other characteristics than heretofore possible.

A more specific object of the present invention is to provide an inexpensive chemical deposition process capable of producing high density magnetic data storage devices which possess desirable magnetic characteristics such as high coercive force, i.e. 200–350 oersteds, and a substantially rectangular hysteresis loop, in addition to the other desirable physical characteristics of excellent adhesion to a supporting medium and resistance to wear.

In accordance with the present invention there has been provided a novel process for fabricating new and improved magnetic data storage devices which comprises the steps of: (1) applying an adhesive coating to a thoroughly cleansed non-metallic substrate; (2) activating the adhesive coated substrate with a metallic catalyst to enable the coated substrate to receive a magnetic deposit; and (3) immersing the activated substrate in an aqueous solution having a pH in the range of 7.6 to 8.2 and including as essential constituents nickel ions of a concentration the range of 0.20 to 0.62 gram/liter, cobalt ions of a concentration substantially equal to six times the nickel ion concentration, ammonium ions in the range of 1.7 to 17 grams/liter, citrate ions in the range of 3.2 to 64 grams/liter, and hypophosphite ions in the range of 0.30 to 6.1 grams/liter, the immersion time being of sufficient length to allow chemical reduction of a magnetic deposit onto the substrate having a coercive force characteristic of at least 200 oersteds.

More specifically with reference to the drawing, a substantially flat non-metallic sheet, which constitutes the supporting substrate portion of the storage device, is selected from such materials as synthetic solid polymers, hard rubber, wood, quartz, glass, ceramics, or the like. It is preferred, however, that the substrate be a relatively thin sheet or ribbon of polyethylene terephthalate, commonly sold under the trademark "Mylar," having a thickness in the order of .005 inch. In order to insure uniform chemical reduction over the surface thereof, it is preferred that the substrate first be rigorously cleaned by immersion in an alkaline cleaner, or sodium lauryl sulfate, and thereafter rinsed in distilled water. However, any of the well-known alkaline-acid cleaning procedures may be used with equal success. Following the cleaning operation, the substrate is dipped into a suitable commercially available heat-curable adhesive containing an evaporable solvent such as, for example, the heat-curable adhesives shown and described in United States Patent No. 2,917,439. The adhesive coated substrate thereafter is air dried for approximately fifteen minutes and then cured at a temperature of approximately 90 degrees C. for a period of approximately thirty minutes. It is to be noted that the particular manner of applying the adhesive coating is not critical. The only restriction is that the adhesive coating be uniform. Thereafter, the adhesive coated Mylar is preferably rinsed in a denatured alcoholic solution.

It is well known by those skilled in the art of chemical deposition that chemical reduction of metallic ions is essentially a controlled autocatalytic reduction of the depositing species on an active metal such as aluminum, iron, nickel, cobalt, palladium, etc., in the presence of hypophosphite ions. However, non-active metals such as copper are normally "activated" by immersion deposition of palladium onto the surface thereon. In the case of a non-conductive polymer material such as the mentioned Mylar, activation is normally accomplished by chemical or vacuum deposition thereon of a copper film, followed by immersion deposition of palladium entities onto the copper film. Alternatively, the substrate may be activated by being impregnated with stannous chloride by means of physical or chemical adsorption, or both, followed by an immersion in the mentioned solution of palladium chloride.

However, in order to insure the formation of a consistently uniform magnetic coating having a square loop characteristic, it is preferred that the adhesive coated substrate be "sensitized" by immersion for a period of approximately 5 minutes in a 20 gram/liter aqueous stannous chloride solution containing approximately 10 cc./liter of concentrated aqueous hydrochloric acid solution, with the temperature of the sensitizing solution being maintained substantially constant at approximately 25 degrees C. Upon completion of the just-described sensitizing operation, the substrate is then activated by being immersed for approximately 5 minutes in a palladium chloride aqueous solution having a concentration of approximately 0.5 gram/liter and containing approximately 5 cc./liter of concentrated hydrochloric acid, with the temperature of the activating solution being maintained substantially constant at approximately 60 degrees C.

Following the activation operation, the final step in the present process is the immersion of the thus-treated substrate in an aqueous solution having concentrations of constituent materials as shown in the following chart, which includes as complexing agents a citric salt and an ammonium salt. It is to be noted, that, in the upper half of the chart is given the concentration of each compound in the actual plating solution measured in grams/liter of aqueous solution. In the lower half of the chart is listed the concentration in grams/liter of aqueous solution of each ion constituent present in solution. In each instance, the minimum, optimum and maximum concentrations for each compound (salt and ion) constituent are given in tabular form. It is to be appreciated, however, that the upper and lower concentration limits of each compound and constituent of the plating solution are not critical in that they specifically define precise limits above and below which is a definite zone of demarcation of all useful magnetic properties possessed by the magnetic coating.

| | Grams/Liter | | |
|---|---|---|---|
| | Min. | Opt. | Max. |
| Plating solution compounds: | | | |
| Cobalt Chloride ($CoCl_2 \cdot 6H_2O$) | 5 | 7.5 | 15 |
| Nickel Chloride ($NiCl_2 \cdot 6H_2O$) | 0.83 | 1.25 | 2.5 |
| Ammonium Chloride ($NH_4Cl$) | 5 | 12.5 | 50 |
| Sodium Citrate ($Na_3C_6H_5O_7 \cdot 2H_2O$) | 5 | 25.0 | 100 |
| Sodium Hypophosphite ($NaH_2PO_2 \cdot 1H_2O$) | .5 | 3.5 | 10 |
| Plating Solution Ion Constituents Derived From the Compounds in the Bath: | | | |
| Cobalt Ions | 1.2 | 1.85 | 3.7 |
| Nickel Ions | 0.20 | 0.31 | 0.62 |
| Ammonium Ions | 1.7 | 4.23 | 17 |
| Citrate Ions | 3.2 | 16.0 | 64.0 |
| Hypophosphite Ions | 0.30 | 2.1 | 6.1 |

As is noted from the above chart, the optimum ratio of cobalt ions to nickel ions in the plating solution should necessarily be approximately 6 to 1, in order to insure the formation of a magnetic deposit having a substantially rectangular hysteresis loop and high coercive force characteristics, so highly desirable in high density magnetic data storage devices.

The activated substrate is maintained immersed in the above-specified aqueous plating solution for approximately 30 minutes, during which time the bath is maintained at a substantially constant temperature, by the use of heating mantles, within the range of 80 degrees C. to 90 degrees C., preferably 85 degrees C., and at a substantially constant pH within the range of 7.6 to 8.2, preferably 8.0, by means of a peristaltic action pump through which ammonium hydroxide is added. The plating operation is continued until a magnetic coating having a thickness in the order of 10,000 A. is deposited on the surface of the activated substrate. Upon emergence from the plating solution, the coated substrate is thereafter rinsed and dried, and is then ready to be incorporated in an electronic computer or data processor as a magnetic data storage device, all in a well-known manner.

The magnetic data storage devices fabricated in accordance with the just-described process have been found to possess a minimum magnetic coercive force characteristic of 200 oersteds, a maximum magnetic coercive force of 350 oersteds, and a ratio of magnetic remanence to saturation magnetization of approximately .85. In addition, such devices have been found to possess excellent adhesion and resistance to physical wear characteristics, and, accordingly, find great utility in computer and data processor applications as a high density magnetic data storage device.

While particular embodiments of the invention have been shown and described, it will be obvious to those skilled in the art of chemical deposition of magnetic materials that changes and modifications may be made without departing from the invention in its broader aspects, and, therefore, the aim of the appended claims is to cover all such changes and modifications as fall within the true spirit and scope of the invention.

What is claimed is:

1. The process of fabricating high density magnetic data storage devices comprising the steps of:

applying a heat-curable adhesive resin coating to a cleansed non-metallic substrate; chemically activating the adhesive-coated substrate to enable the substrate to receive a magnetic deposit by chemical reduction; thereafter immersing the substrate in an aqueous bath solution having a pH in the range of 7.6 to 8.2 and including as essential constituents nickel ions of a concentration in the range of 0.20 to 0.62 gram/liter, cobalt ions of a concentration substantially equal to 6 times the nickel ion concentration, ammonium ions of a concentration in the range of 1.7 to 17 grams/liter, citrate ions of a concentration in the range of 3.2 to 64 grams/liter and hypophosphite ions of a concentration in the range of 0.30 to 6.1 grams/liter, and maintaining said substrate in said bath solution for a time to effect chemical reduction of a nickel-cobalt deposit on said substrate having a coercive force of at least 200 oersteds.

2. A high density magnetic data storage device fabricated in accordance with the process of claim 1.

3. The process of fabricating high density magnetic data storage devices comprising the steps of:

applying a heat-curable adhesive resin coating to a cleansed non-magnetic substrate; chemically activating the adhesive-coated substrate to enable the substrate to receive a magnetic deposit by chemical reduction; thereafter immersing the substrate in an aqueous bath solution having a pH in the range of 7.6 to 8.2 and including as essential constituents nickel ions of a concentration in the range of 0.20 to 0.62 gram/liter, cobalt ions of a concentration substantially equal to 6 times the nickel ion concentration, ammonium ions of a concentration in the range of 1.7 to 17 grams/liter, citrate ions of a concentration in the range of 3.2 to 64 grams/liter, and hypophosphite ions of a concentration in the range of 0.30 to 6.1 grams/liter, and maintaining said substrate in said bath solution for a time sufficient to effect chemical reduction of a nickel-cobalt deposit on said substrate having a coercive force of at least 200 oersteds.

4. The process of fabricating high density magnetic data storage devices comprising the steps of:

applying a heat-curable adhesive resin coating to a cleansed non-metallic substrate; chemically activating the adhesive-coated substrate to enable the substrate to receive a magnetic deposit by chemical reduction; thereafter immersing the substrate in an aqueous bath solution having a pH of approximately 8.0 and including as essential constituents cobalt ions of a concentration of approximately 1.85 grams/liter, nickel ions of a concentration of approximately 0.31 gram/liter, ammonium ions of a concentration of approximately 4.23 grams/liter, citrate ions of a concentration of approximately 16.0 grams/liter and hypophosphite ions of a concentration of approximately 2.1 grams/liter, and maintaining said substrate in said bath solution for a time sufficient to effect chemical reduction of a nickel-cobalt deposit on said substrate having a coercive force of at least 200 oersteds.

5. A high density magnetic data storage device fabricated in accordance with the process of claim 4.

6. The process of fabricating high density magnetic data storage devices comprising the steps of:

applying a heat-curable adhesive resin coating to a cleansed non-magnetic substrate; chemically activating the adhesive-coated substrate to enable the substrate to receive a magnetic deposit by chemical reduction; thereafter immersing the substrate in an aqueous bath solution having a pH of approximately 8.0 and including as essential constituents cobalt ions of a concentration of approximately 1.85 grams/liter, nickel ions of a concentration of approximately 0.31 gram/liter, ammonium ions of a concentration of approximately 4.23 grams/liter, citrate ions of a concentration of approximately 16.0 grams/liter and hypophosphite ions of a concentration of approximately 2.1 grams/liter, and maintaining said substrate in said bath solution for a time sufficient to effect chemical reduction of a nickel-cobalt deposit on said substrate having a coercive force of at least 200 oersteds.

7. A process for forming a magnetic nickel-cobalt coating on a non-metallic, heat-curable adhesive resin coated substrate including the steps of chemically activating the surface of the adhesive-coated substrate by providing it with a coating of microscopic particles of palladium and thereafter causing reduction precipitation of cobalt-nickel thereon as a plating by dipping it into a hot solution containing nickel ions in a concentration in the range of .20 to .62 gram/liter, and cobalt ions of a concentration of approximately 6 times the nickel ion concentration, and complexing salts providing citrate and ammonium ions, the solution containing hypophosphite ions and being kept in a pH range of 7.6–8.2.

References Cited in the file of this patent

UNITED STATES PATENTS

| | | |
|---|---|---|
| 2,351,940 | Dupuis | June 20, 1944 |
| 2,532,283 | Brenner | Dec. 5, 1950 |
| 2,917,439 | Liu | Dec. 15, 1959 |

FOREIGN PATENTS

| | | |
|---|---|---|
| 749,824 | Great Britain | June 6, 1956 |

OTHER REFERENCES

Tsu: IBM Technical Disclosure Bulletin, vol. 2, No. 3, October 1959.

Brenner et al.: "Deposition of Nickel and Cobalt by Chemical Reduction," Journal of Research of the National Bureau of Standards, volume 39, Research Paper RP 1835, pages 385–395, November 1947.

Tsu et al.: IBM Technical Disclosure Bulletin, vol 4, No. 8, page 52, January 1962.

"Symposium on Electroless Nickel Plating," ASTM Special Technical Publication, No. 265, pages 16, 34, and 36, American Society for Testing Materials, Philadelphia, 1959.